(12) United States Patent
Williams

(10) Patent No.: US 6,363,493 B1
(45) Date of Patent: Mar. 26, 2002

(54) METHOD AND APPARATUS FOR AUTOMATICALLY REINTEGRATING A MODULE INTO A COMPUTER SYSTEM

(75) Inventor: Emrys J. Williams, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/303,058

(22) Filed: Apr. 30, 1999

(51) Int. Cl.$^7$ ................................................ G06F 11/00
(52) U.S. Cl. ........................................... 714/1; 710/103
(58) Field of Search ................................ 714/1, 3, 6, 7, 714/8, 10, 11, 13, 20, 25, 31, 43; 710/5, 7, 15, 17, 102, 103

(56) References Cited

U.S. PATENT DOCUMENTS

| | | | | |
|---|---|---|---|---|
| 4,503,535 A | * | 3/1985 | Budde et al. ................... | 371/11 |
| 5,423,050 A | * | 6/1995 | Taylor et al. ................. | 395/575 |
| 6,038,680 A | * | 3/2000 | Olarig ........................... | 714/6 |
| 6,108,732 A | * | 8/2000 | Klein ........................... | 710/103 |
| 6,178,520 B1 | * | 1/2001 | DeKoning et al. .............. | 714/5 |
| 6,240,526 B1 | * | 5/2001 | Petivan et al. ................ | 714/11 |

FOREIGN PATENT DOCUMENTS

| | | |
|---|---|---|
| EP | 0 552 873 A1 | 1/1993 |
| EP | 0 768 559 A1 | 4/1997 |

* cited by examiner

*Primary Examiner*—Nadeem Iqbal
(74) *Attorney, Agent, or Firm*—Park, Vaughan & Fleming LLP

(57) ABSTRACT

A system that automatically integrates a module into a computer system to replace a module that has failed. The system operates by detecting an insertion of the module into the computer system. In response to this insertion, the system reads information from the module in order to identify what type of module has been inserted into the computer system. If the newly inserted module cannot perform functions of the prior module, the system signals an error condition. The system additionally reads information from the module in order to determine if the module has failed since it was first shipped or last repaired. This information was originally written by this or another system upon detection of a failure. If the module has failed since it was first shipped or last repaired, the system signals an error condition. Finally, if no error condition is signaled, the system integrates the module into the computer system. In a variation on the above embodiment, this integration process involves running functional tests on the module, and loading configuration information into the module. Thus, the present invention speeds up the integration process by dispensing with the need to manually enter integration commands into the computer system. This creates fewer opportunities for error because a technician is not required to memorize integration commands and will not inadvertently enter the wrong commands. The present invention also encourages proper service practice by encouraging a technician to return a failed module to a service depot, instead of simply cycling the injection switch of a module to "repair" the unit.

29 Claims, 2 Drawing Sheets

METHOD AND APPARATUS FOR AUTOMATICALLY REINTEGRATING A MODULE INTO A COMPUTER SYSTEM

BACKGROUND

1. Field of the Invention

The present invention relates to fault-tolerance mechanisms in computer systems. More specifically, the present invention relates to a method and an apparatus for automatically integrating a module into an operating computer system to replace a module that has failed.

2. Related Art

Hot maintained computer systems are designed to facilitate removal and replacement of broken modules while the computer system is operating. When a module fails within a redundant hot maintained computer system, a secondary module takes over for the failed module. This allows the computer system to continue operating without interruption. The failed module is subsequently removed from the computer system and a replacement module is inserted in its place. Once the replacement module has been inserted, a technician manually enters commands to integrate the module into the computer system. This integration process typically involves: making preliminary checks on the replacement module; powering on the replacement module; running functional test on the replacement module; and loading state information into the replacement module.

The fact that the integration process requires commands to be entered manually can give rise to a number of problems. First, the technician must find the system console in order to enter integration commands. Second, the technician must remember the integration commands. If the technician forgets a command or inadvertently enters a wrong command, the technician can potentially cause the computer system to crash. Furthermore, allowing the technician to control the integration process can allow for sloppy service practice. In some situations a service technician may try to integrate a questionable failed module into the computer system on the chance that it will operate properly, instead of returning the failed module to a service depot for testing.

What is needed is a method and an apparatus for automatically integrating a replacement module into an operating computer system without requiring a technician to explicitly enter integration commands.

SUMMARY

One embodiment of the present invention provides a system that automatically integrates a module into a computer system to replace a module that has failed. The system operates by detecting an insertion of the module into the computer system. In response to this insertion, the system reads information from the module in order to identify what type of module has been inserted into the computer system. If the newly inserted module cannot perform the functions of the prior module, the system signals an error condition. The system additionally reads information from the module in order to determine if the module has failed since it was first shipped or last repaired. This information was originally written by this or another system upon detection of a failure. If the module has failed since it was first shipped or last repaired, the system signals an error condition. Finally, if no error condition is signaled, the system integrates the module into the computer system. In a variation on the above embodiment, this integration process involves running functional tests on the module, and loading configuration information into the module. Thus, the present invention speeds up the reintegration process by dispensing with the need to manually enter integration commands into the computer system. This creates fewer opportunities for error because a technician is not required to memorize integration commands and will not inadvertently enter the wrong commands. The present invention also fosters proper service practice by encouraging a technician to return a failed module to a service depot, instead of simply cycling the injection switch of a module to "repair" the unit. Note that the present invention is not limited to hot maintained or redundant computer systems. It can generally be used in any computer system with a processor that can observe insertion and removal of a module during maintenance.

In another variation, detecting the insertion of the module into the computer system includes receiving information from an electrical circuit that detects the presence of the module in the computer system. In another variation, detecting the insertion of the module into the computer system includes periodically polling the module to determine whether the module is present in the computer system.

In a further variation on the above embodiment, the system allows a human operator to bypass the automatic integration process by receiving integration commands entered manually by the human operator.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
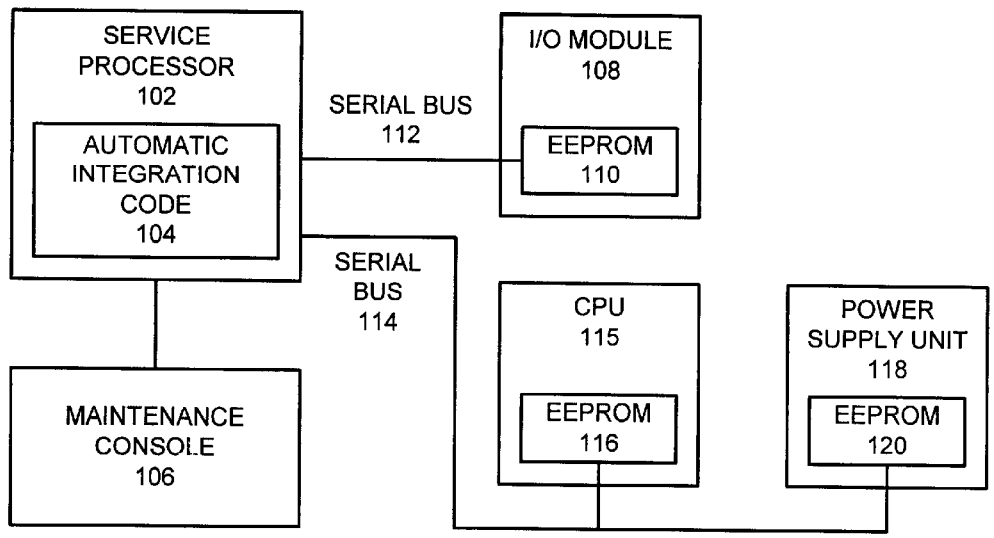
FIG. 1 illustrates a computer system that supports automatic integration of replacement modules in accordance with an embodiment of the present invention.

FIG. 1 illustrates a computer system that supports automatic integration of replacement modules in accordance with an embodiment of the present invention. This computer system includes service processor 102, maintenance console 106, I/O module 108, central processing unit (CPU) 115 and power supply unit 118.

Service processor 102 coordinates the replacement of the other modules in the computer system, including I/O module 108, CPU 115 and power supply unit 118. Service processor 102 may generally include any type of computational device, including but not limited to, a mainframe processor, a microprocessor, and a device controller. Service processor 102 may be any one of the processors of the hot maintained system. Service processor 102 includes automatic integration code 104, which automatically integrates a module into an operating computer system to replace a module that has failed. Note that the functionality provided by integration code 104 may alternatively be implemented through special purpose hardware to perform the integration task.

Service processor 102 is coupled to maintenance console 106, which allows a human operator to control the actions of service processor 102. If necessary, a human operator can override the automatic integration process through maintenance console 106.

Service processor 102 may be coupled with I/O module 108, CPU 115 and power supply unit 118 through various communication channels. In the embodiment illustrated in FIG. 1, serial bus 112 couples service processor 102 to I/O module 108, and serial bus 114 couples service processor 102 to CPU 115 and power supply unit 118. Serial buses 112 and 114 may include any communication channel for communicating between service processor 102 and other modules in the computer system. This may include, but is not limited to, multi-wire buses, optical fiber linkages and infrared communication channels. In one embodiment of the present invention, serial buses 112 and 114 adhere to the i2C serial bus protocol.

I/O module 108 may include any type of controller or interface to an I/O device. This may include a disk drive controller or a network communications controller. CPU 115 may include any type of computational device. This includes, but is not limited to, a CPU for a mainframe computer, a microprocessor, a device controller, and even a computational engine within an appliance. Power supply unit 118 may be any type of modular power supply for the computer system, including a battery-based power supply or a transformer based power supply.

In order for the computer system to keep functioning when a module fails, the computer system includes redundant "secondary" modules, which are not shown. For example, the computer system may include a primary I/O module and a secondary I/O module. If the primary I/O module fails, the secondary takes over and becomes the new primary. When the failed primary is eventually replaced, the replacement module becomes the new secondary. If the secondary I/O module fails, the primary keeps operating as if nothing happened. When the failed secondary is eventually replaced, the replacement module becomes the new secondary.

Note that I/O module 108, CPU 115 and power supply unit 118 include electrically erasable read only memories (EEPROMs) 110, 116 and 120, respectively. These EEPROMs can be written to and read by service processor 102. This allows module information, such as a module serial number or module history information, to be read by service processor 102 during the automatic integration process. In general, any type of non-volatile memory, such as flash memory or a battery-backed up memory, can be used in place of EEPROMs 110, 116 and 120.

Also note that the computer system may include replaceable modules. For example, the computer system may include replaceable modules for memory devices, communication channels, input devices, output devices and other peripheral devices. In general, any component in a computer system can be incorporated into a replaceable module.

Insertion Detection Circuitry

Figure 2:
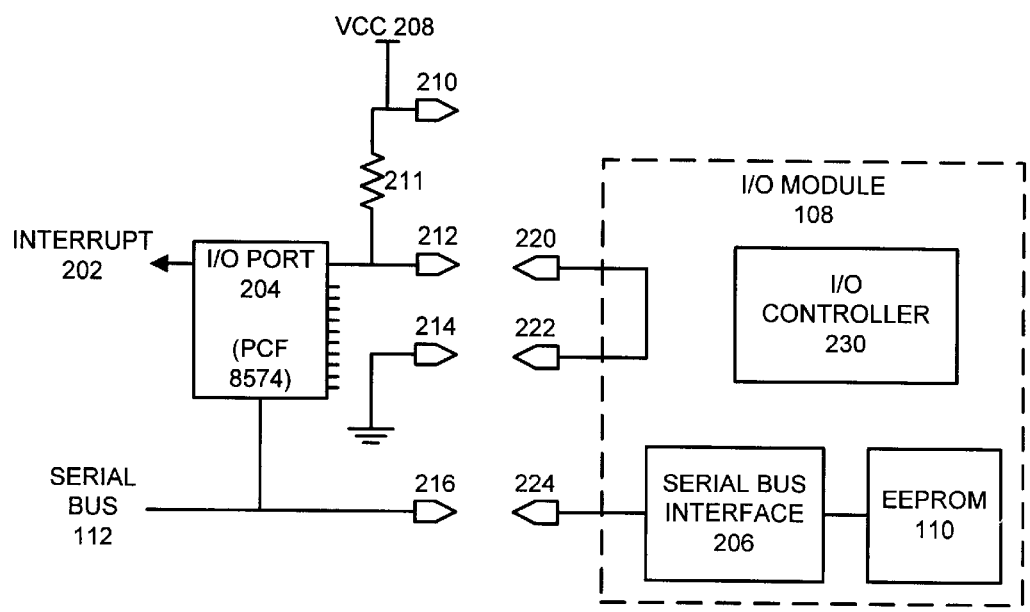
FIG. 2 illustrates circuitry to detect insertion of a module into the computer system in accordance with an embodiment of the present invention.

FIG. 2 illustrates circuitry within the computer system to detect insertion of a module in accordance with an embodiment of the present invention. The left-hand side of FIG. 2 illustrates circuitry within the backplane of the computer system for detecting insertion of a module. The right-hand side of FIG. 1 illustrates corresponding circuitry within I/O module 108 to facilitate the detection.

The insertion detection circuitry on the left-hand side of FIG. 2 includes I/O port 204 (PCF 8574 manufactured by the Philips Corporation), which is an I/O port device for supporting serial communications across the i2C bus. I/O port 204 includes a plurality of inputs on its right-hand side. If any of these inputs changes, I/O port 204 generates an interrupt signal on interrupt signal line 202. This interrupt causes the computer system to execute code which determines which device coupled to I/O port 204 has been inserted or removed from the computer system. One of the inputs to I/O port 204 is coupled to contact 212. When I/O module 108 is removed from the backplane of the computer system, contact 212 is pulled to a high voltage value by resistor 211 to VCC 208. When I/O module 108 is inserted into the backplane of the computer system, contact 212 is pulled to a ground voltage level through the pathway between contacts 220 and 222 on I/O module 108, and the pathway between contact 214 and ground within the backplane of the computer system.

Serial bus 112 is coupled to I/O port 204. Serial bus 112 is additionally coupled to serial bus interface 206 within I/O module 108. This allows serial bus 112 to communicate with EEPROM 110 within I/O module 108.

Note that I/O module 108 additionally includes I/O controller 230, which controls an I/O device, such as a disk drive.

Although FIG. 2 illustrates a hardware mechanism for detecting module insertion, module insertion can alternatively be detected through software by periodically polling modules within the computer system.

Integration Process

Figure 3:
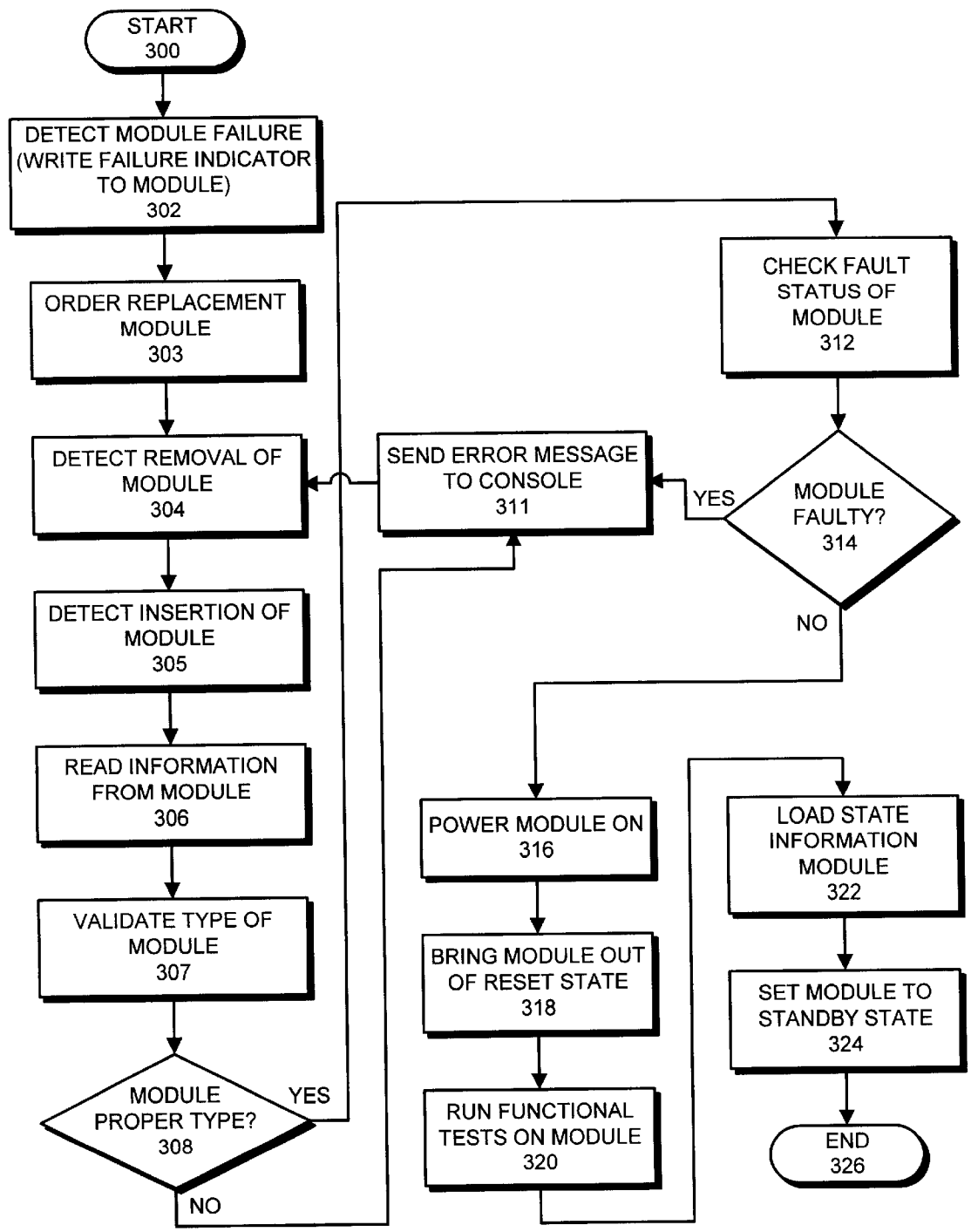
FIG. 3 is a flow chart illustrating the process of integrating a module into the computer system in accordance with an embodiment of the present invention.

FIG. 3 is a flow chart illustrating the process of integrating a module into a computer system in accordance with an embodiment of the present invention. This process illustrated in FIG. 2 operates on the computer system illustrated in FIG. 1 and uses the insertion detection circuitry illustrated in FIG. 2.

The system starts by detecting a failure of a module (step 302). For example, service processor 102 in FIG. 1 may detect the failure of I/O module 108. Next, the system takes actions to deal with the failure. This may involve switching over to a backup secondary module if a primary module fails. This may also involve writing a failure indication to non-volatile storage in module 108.

Next, the system orders a replacement module (step 303). This may involve sending a message to a system administrator through a console, or it may involve automatically contacting a service technician located at a service depot through a modem or computer network.

When the module is ultimately replaced, the system detects a removal of the module (step 304). In the embodiment illustrated in FIG. 2, removal detection is triggered by I/O port 204, which generates an interrupt on interrupt signal line 202 when I/O module 108 is removed from the backplane of the computer system. As mentioned above, the removal and insertion detection can alternatively be implemented in software by writing a program that periodically polls each module in the system. For example, service processor 102 in FIG. 2 may periodically attempt to read EEPROM 110 within I/O module 108. When I/O module 108 is removed from the backplane of the computer system, service processor 102 will not be able to read EEPROM 110.

Next, the system detects an insertion of a replacement module (step 305). Note that insertion detection can be accomplished through the circuitry illustrated in FIG. 2 or through polling in much the same way that module removal was detected.

In response to detecting insertion of the replacement module, the system automatically reads information from the module (step 306). In the embodiment illustrated in FIG. 1, this involves reading EEPROM 110 within I/O module 108.

The information read from the module is used to validate the type of module (step 307). For example, service processor 102 determines from the information read from the replacement module whether or not the replacement module can perform the same functions of the module it is meant to replace (steps 307 and 308). If the replacement module cannot perform the required functions, the system sends an error message (step 311) and returns to step 304 to await a new replacement module. This checking of module type prevents the system from automatically integrating the wrong type of module into the system when a technician inadvertently replaces the module with the wrong type of replacement module.

If the module is of the correct type, the system examines history information within the module to determine the fault status of the module (step 312). The module is considered "faulty" if an error has been detected in the module since the module was first shipped or last repaired. When the system detects a failure in an operating module, it writes a fault status bit located in non-volatile storage in the module. This bit is cleared when the module is first shipped, or after the module is repaired by a repair process. This checking of the fault status bit copes with the problem of a technician merely cycling the injection switch of a module to "repair" the unit. It also copes with the technician innocently mixing up the failed module with the replacement module during the replacement process.

If the history information indicates that the module is faulty, the system sends an error message to the console (step 311) and returns to step 304 to await a new replacement module. Otherwise, if the last thing that happened to the module was not a failure, for example passing a certification test or some other innocuous event, the system commences the reintegration process.

If the history information indicates that the module is not faulty, the system proceeds with the integration process. In the embodiment of the present invention illustrated in FIG. 3, the integration process involves powering on the module (step 316), bringing the module out of its initial reset state (step 318), and then running functional tests on the module to ensure that the module is functioning properly (step 320). When these functional tests complete successfully, the system loads state information into the module (step 322). This state information matches state information contained in a corresponding primary module. This allows the newly inserted module to take over for the primary in case the primary fails at some time in the future. Next, the system sets the module into a standby state to await normal processing operations (step 324).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for integrating a module into a computer system to replace a prior module that has failed, the integration process taking place automatically under control of the computer system without human intervention, the method comprising:

detecting an insertion of the module into the computer system;

reading information from the module in response to detecting the insertion of the module;

determining from the information read from the module what type of module has been inserted into the computer system;

signaling an error condition if the type of module that has been inserted cannot perform functions of the prior module;

determining from the information read from the module whether the module has failed since the module was first shipped or last repaired;

signaling an error condition if the module has failed since the module was first shipped or last repaired; and integrating the module into the computer system if no error condition has been signaled.

2. The method of claim 1, wherein integrating the module into the computer system comprises:

running functional tests on the module; and loading configuration information into the module.

3. The method of claim 1, further comprising updating a fault status indicator located in non-volatile storage in the module if a fault is located in the module.

4. The method of claim 1, wherein determining if the module has failed since the module was first shipped or last repaired includes examining history information from the module to determine the fault status of the module.

5. The method of claim 1, wherein detecting the insertion of the module into the computer system includes detecting a removal of the prior module from the computer system.

6. The method of claim 1, wherein detecting the insertion of the module into the computer system includes receiving information from an electrical circuit that detects a presence of the module in the computer system.

7. The method of claim 1, wherein detecting the insertion of the module into the computer system includes periodically polling the module to determine whether the module is present in the computer system.

8. The method of claim 1, wherein reading the information from the module includes reading the information from a non-volatile memory within the module.

9. The method of claim 1, further comprising receiving integration commands entered manually by a human operator in order to achieve integration despite the fault status of the module indicating that the module has failed since the module was first shipped or last repaired.

10. The method of claim 1, further comprising detecting that the prior module has failed and indicating that the prior module is due to be replaced.

11. The method of claim 1, further comprising if an error condition is signaled:
   removing the module from the computer system;
   repairing the module; and
   clearing a fault indicator in the module to indicate that the module has been repaired.

12. A method for integrating a module into a computer system to replace a prior module that has failed, the integration process taking place automatically under control of the computer system without human intervention, the method comprising:
   detecting that the prior module has failed and indicating that the prior module is due to be replaced;
   detecting a removal of the prior module from the computer system;
   detecting an insertion of the module into the computer system;
   reading information from a non-volatile memory within the module in response to detecting the insertion of the module;
   determining from the information read from the module what type of module has been inserted into the computer system;
   signaling an error condition if the type of module that has been inserted cannot perform functions of the prior module;
   determining from the information read from the module whether the module has failed since the module was first shipped or last repaired; and
   signaling an error condition if the module has failed since the module was first shipped or last repaired.

13. The method of claim 12, further comprising if no error condition has been signaled, integrating the module into the computer system, wherein integrating the module includes,
   running functional tests on the module, and
   loading configuration information into the module.

14. The method of claim 12, wherein determining if the module has failed since the module was first shipped or last repaired includes examining history information from the module to determine the fault status of the module.

15. The method of claim 12, wherein detecting the insertion of the module into the computer system includes receiving information from an electrical circuit that detects a presence of the module in the computer system.

16. The method of claim 12, wherein detecting the insertion of the module into the computer system includes periodically polling the module to determine whether the module is present in the computer system.

17. The method of claim 12, further comprising receiving integration commands entered manually by a human operator in order to achieve integration despite the fault status of the module indicating that the module has failed since the module was first shipped or last repaired.

18. The method of claim 12, further comprising updating a fault status indicator located in non-volatile storage in the module if an error is detected in the module.

19. The method of claim 12, further comprising if an error condition is signaled:
   removing the module from the computer system;
   repairing the module; and
   clearing a fault indicator in the module to indicate that the module has been repaired.

20. A computer readable storage medium storing instructions that when executed by a computer cause the computer to perform a method for integrating a module into a computer system to replace a prior module that has failed, the integration process taking place automatically under control of the computer system without human intervention, the method comprising:
   detecting an insertion of the module into the computer system;
   reading information from the module in response to detecting the insertion of the module;
   determining from the information read from the module what type of module has been inserted into the computer system;
   signaling an error condition if the type of module that has been inserted cannot perform functions of the prior module;
   determining from the information read from the module whether the module has failed since the module was first shipped or last repaired;
   signaling an error condition if the module has failed since the module was first shipped or last repaired; and
   integrating the module into the computer system if no error condition has been signaled.

21. An apparatus that integrates a module into a computer system to replace a prior module that has failed, the integration process taking place automatically under control of the computer system without human intervention, the method comprising:
   an insertion detection mechanism within the computer system that automatically detects an insertion of the module into the computer system;
   an information reading mechanism that reads information from the module in response to detecting the insertion of the module;
   an error signaling mechanism that is configured to determine from the information read from the module what type of module has been inserted into the computer system, and to signal an error condition if the type of module that has been inserted cannot perform functions of the prior module;
   wherein the error signaling mechanism is additionally configured to determine from the information read from the module whether the module has failed since the module was first shipped or last repaired, and to signal an error condition if the module has failed since the module was first shipped or last repaired; and
   a integration mechanism that is configured to integrate the module into the computer system if no error condition has been signaled.

22. The apparatus of claim 21, wherein the integration mechanism is configured to integrate the module into the computer system by:
   running functional tests on the module; and
   loading configuration information into the module.

23. The apparatus of claim 21, further comprising a fault status updating mechanism that updates a fault status indicator located in non-volatile storage in the module if a fault is located in the module.

24. The apparatus of claim 21, wherein the error signaling mechanism is configured to determine if the module has failed since the module was first shipped or last repaired by examining history information from the module to determine the fault status of the module.

25. The apparatus of claim 21, wherein the insertion detection mechanism includes an electrical circuit that detects a presence of the module in the computer system.

26. The apparatus of claim 21, wherein the insertion detection mechanism is configured to periodically poll the module to determine whether the module is present in the computer system.

27. The apparatus of claim 21, further comprising a manual integration mechanism that is configured to receive integration commands entered manually by a human operator in order to achieve integration despite the fault status of the module indicating that the module has failed since the module was first shipped or last repaired.

28. The apparatus of claim 21, further comprising a module failure detection mechanism that is configured to detect that the prior module has failed and to indicate that the prior module is due to be replaced.

29. A computer instruction signal embodied in a carrier wave carrying instructions that when executed by a computer cause the computer to perform a method for integrating a module into a computer system to replace a prior module that has failed, the integration process taking place automatically under control of the computer system without human intervention, the method comprising:

detecting an insertion of the module into the computer system;

reading information from the module in response to detecting the insertion of the module;

determining from the information read from the module what type of module has been inserted into the computer system;

signaling an error condition if the type of module that has been inserted cannot perform functions of the prior module;

determining from the information read from the module whether the module has failed since the module was first shipped or last repaired;

signaling an error condition if the module has failed since the module was first shipped or last repaired; and integrating the module into the computer system if no error condition has been signaled.

* * * * *